FIG_19

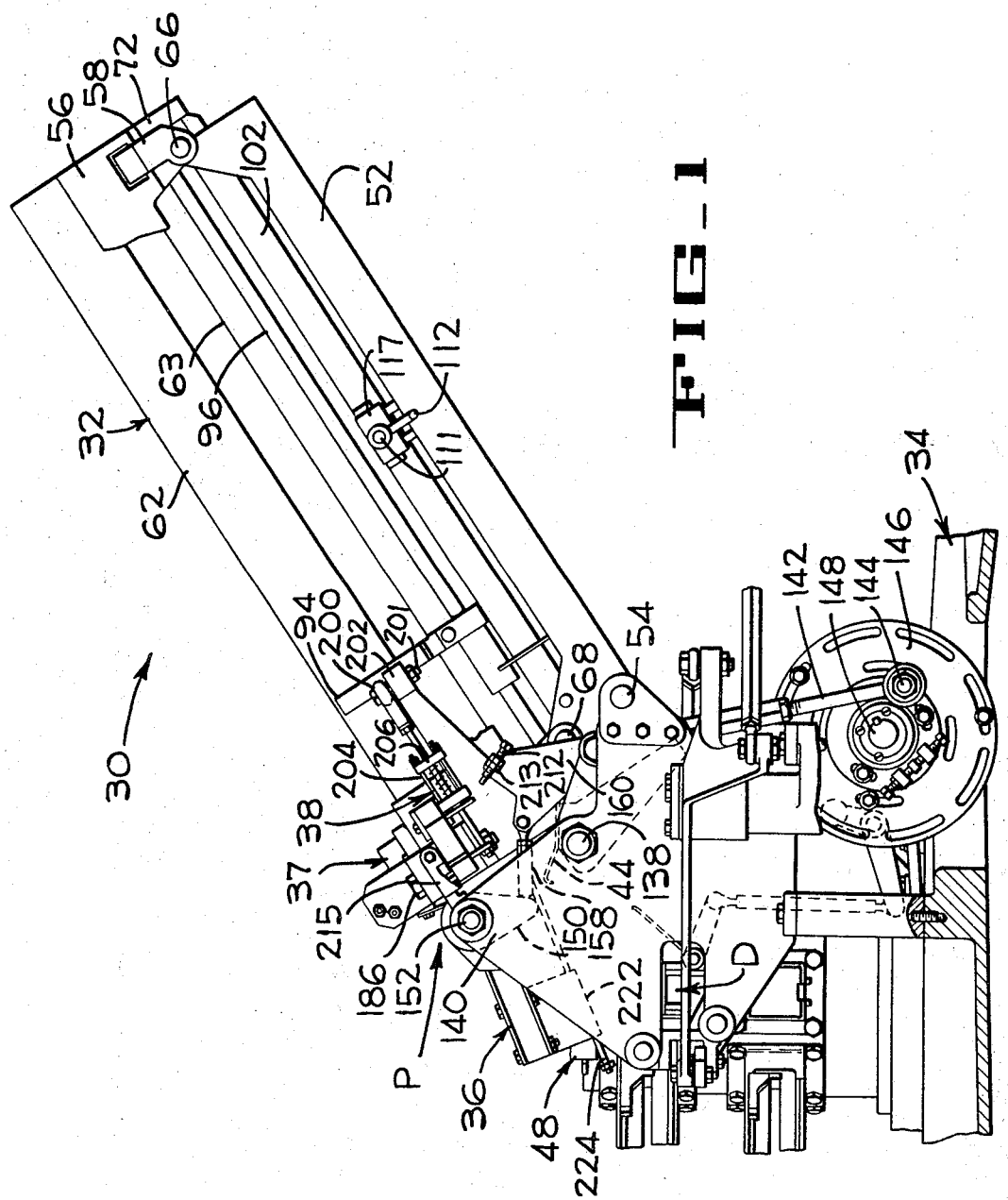

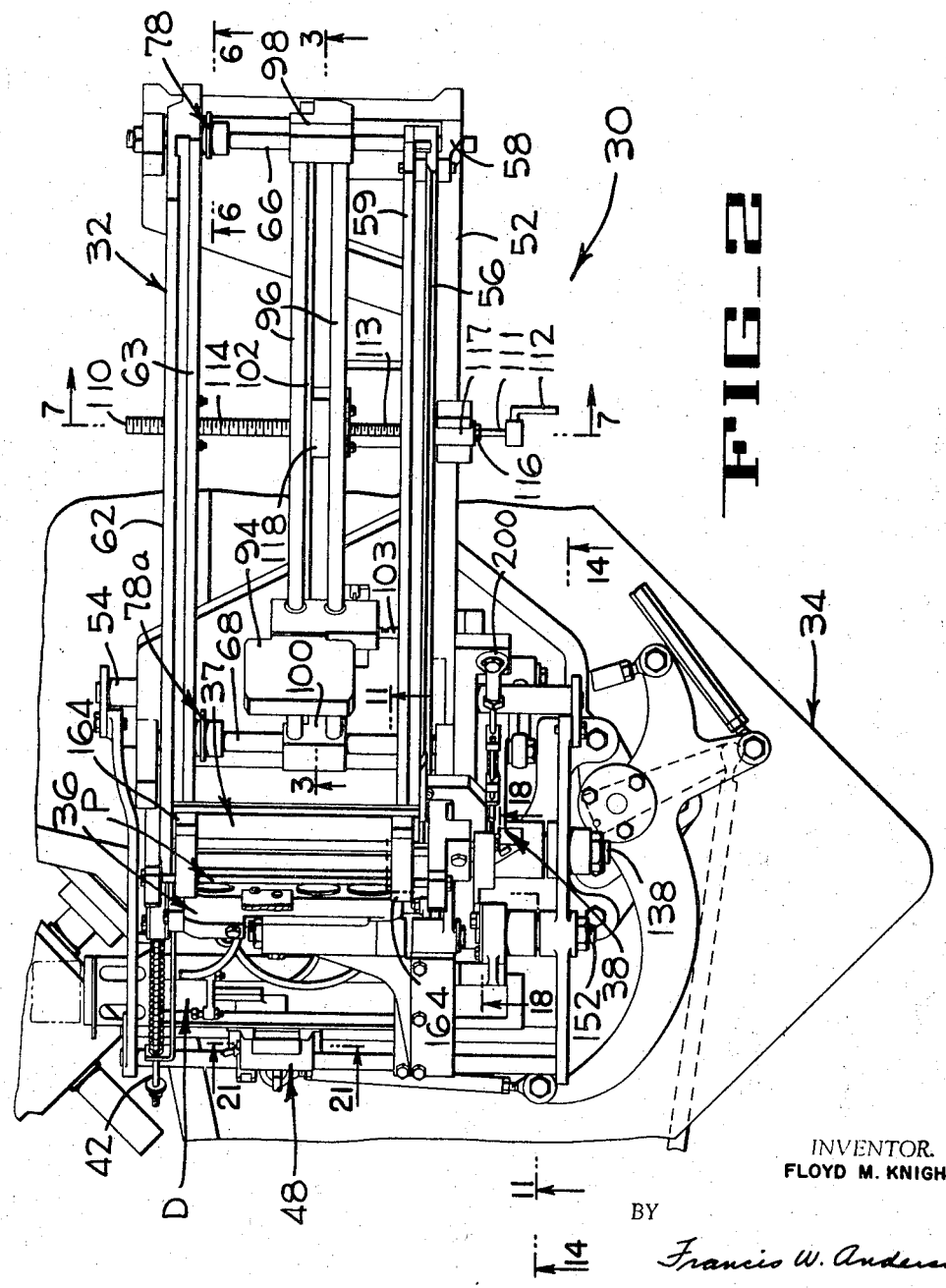

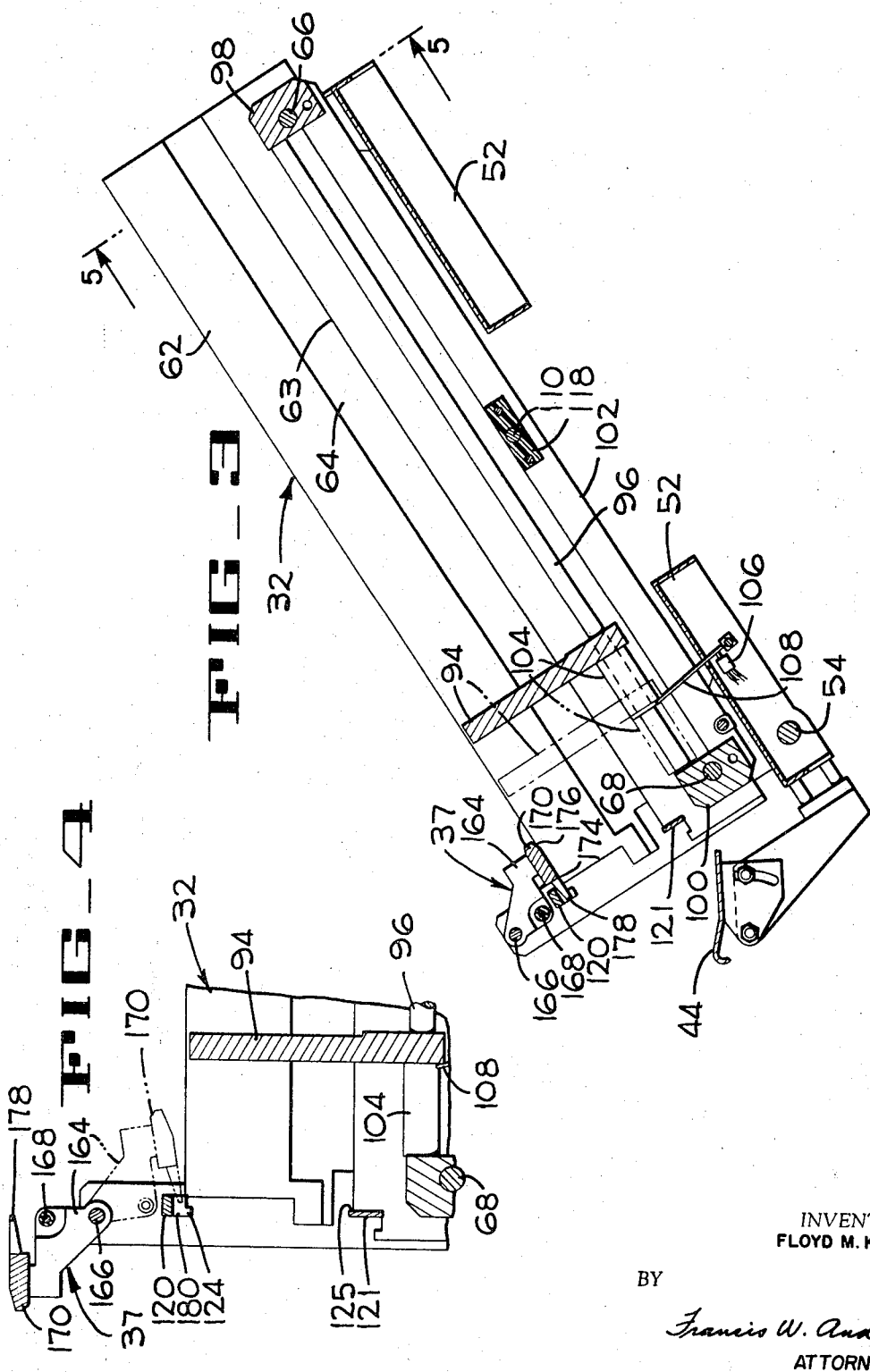

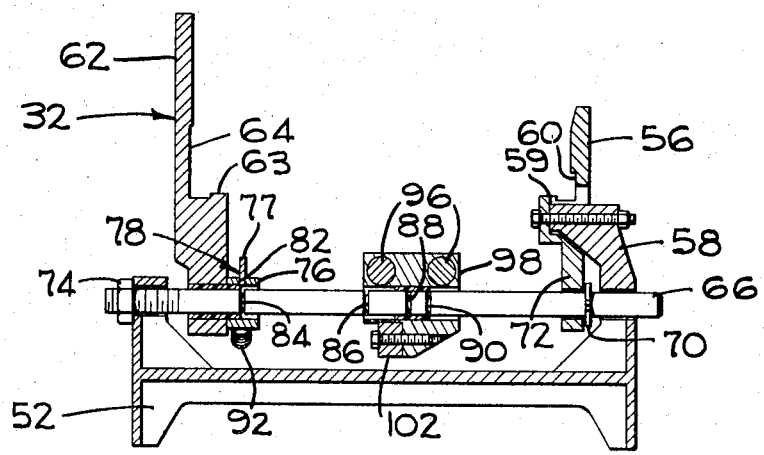
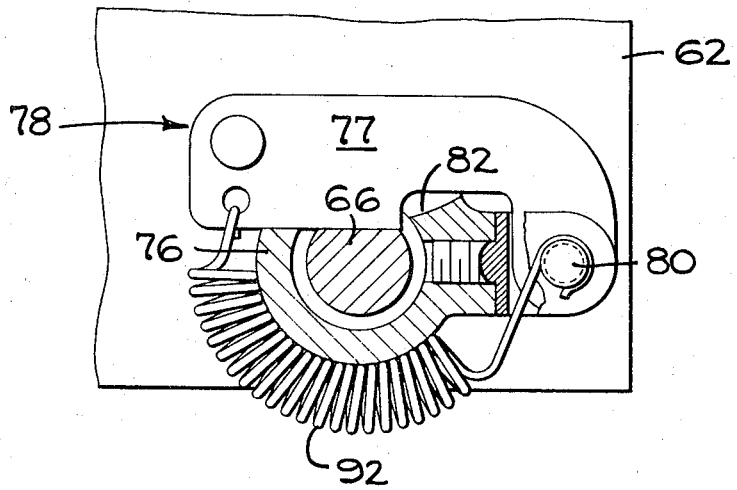

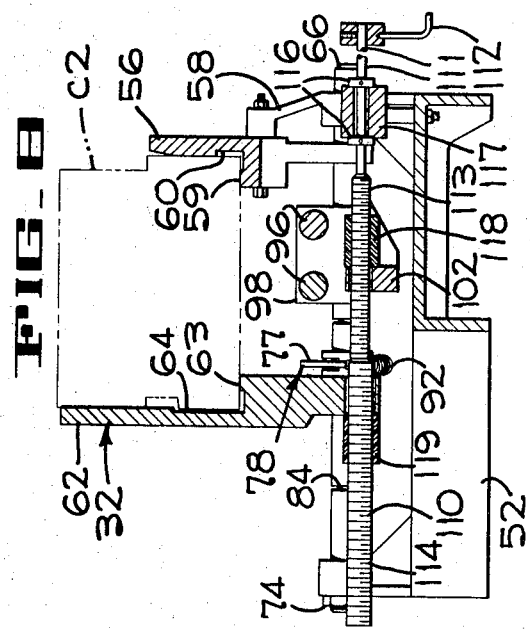
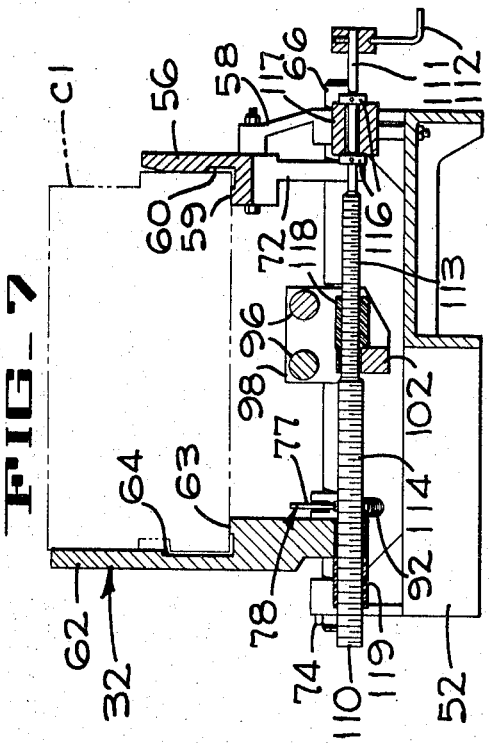
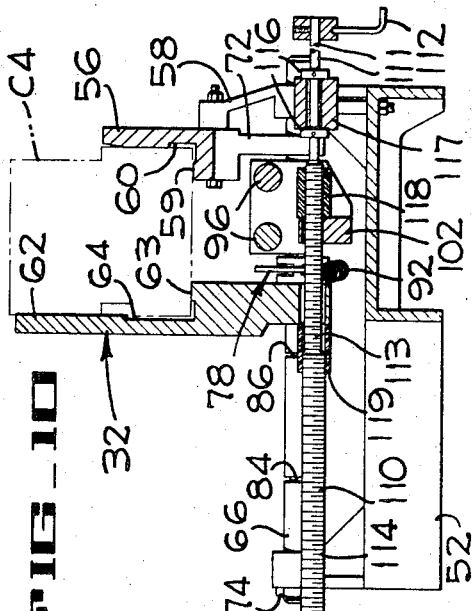
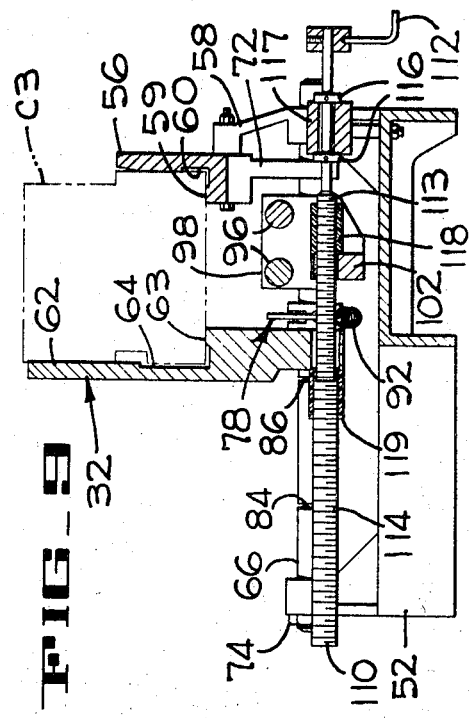

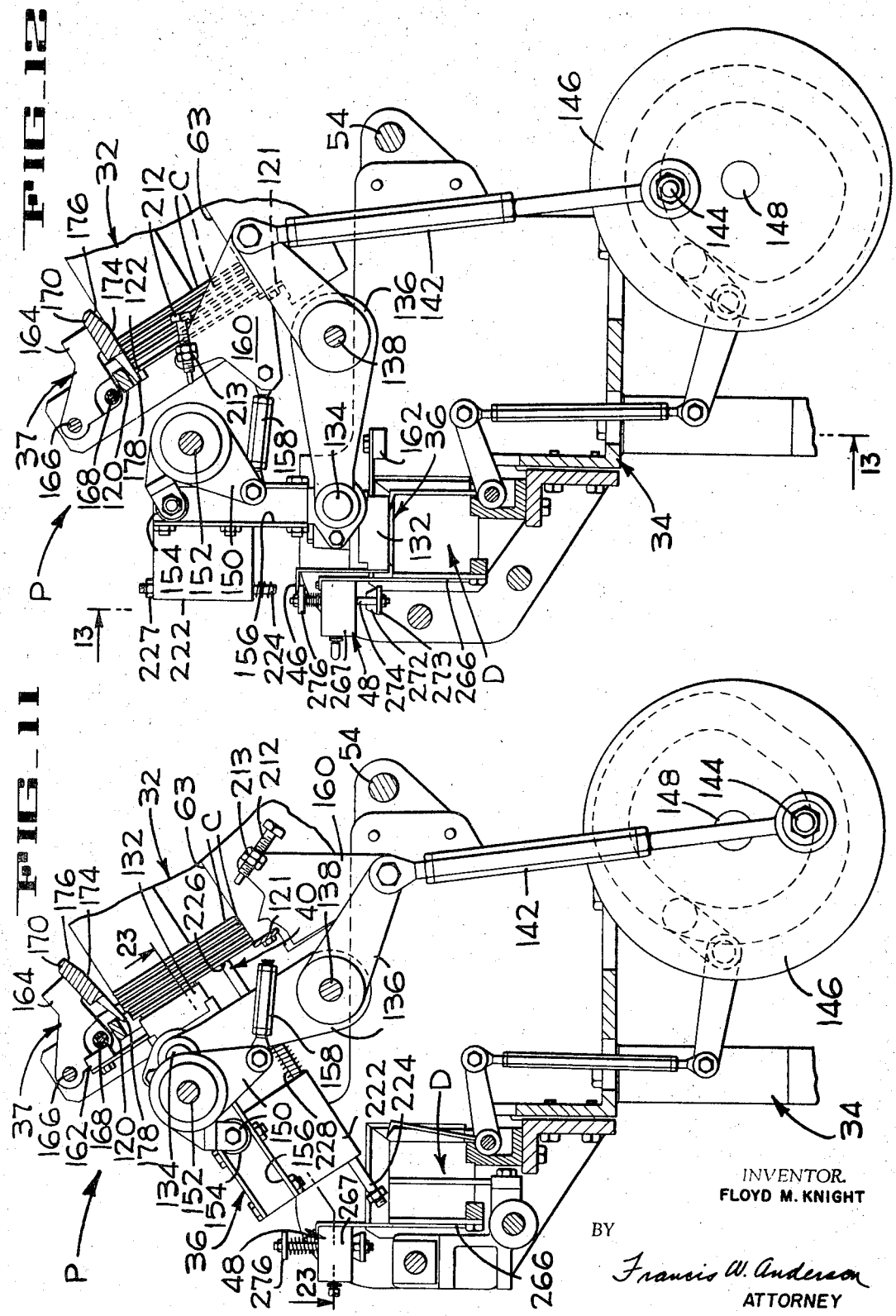

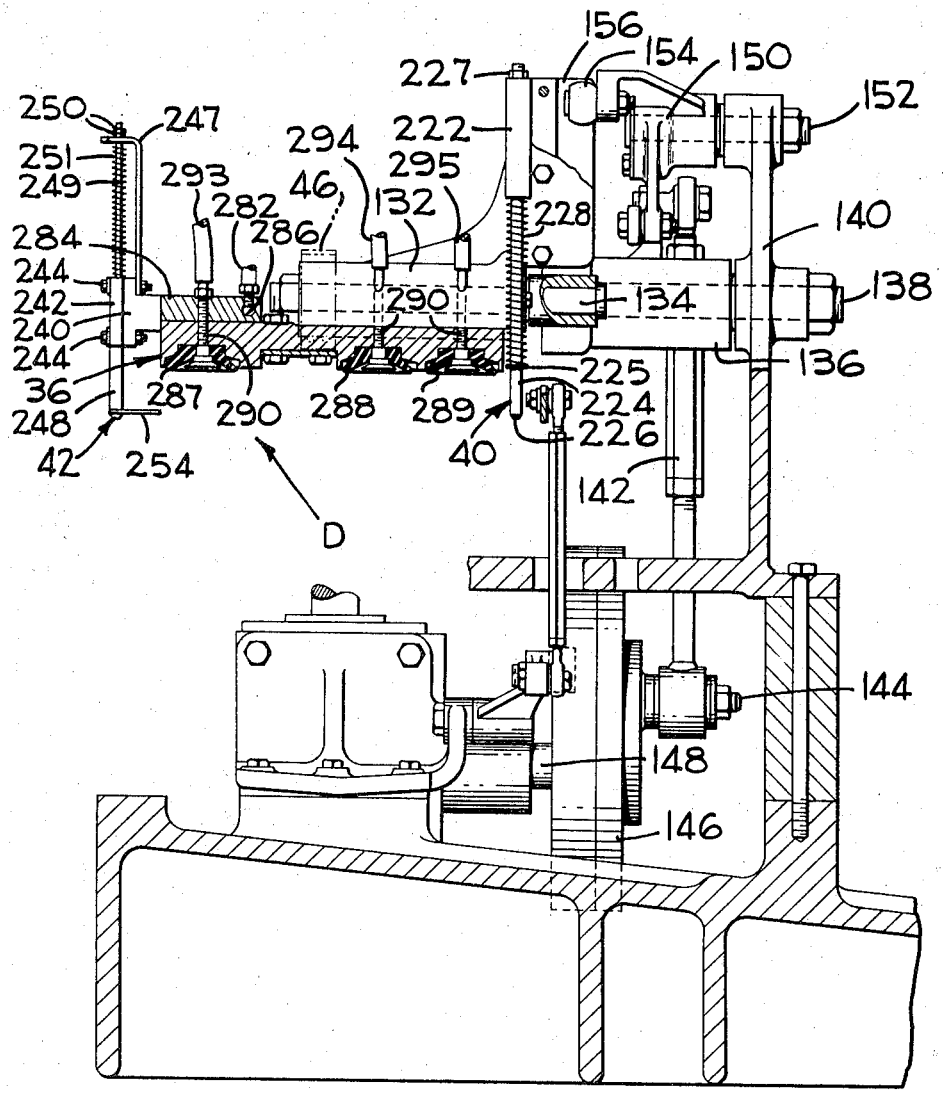

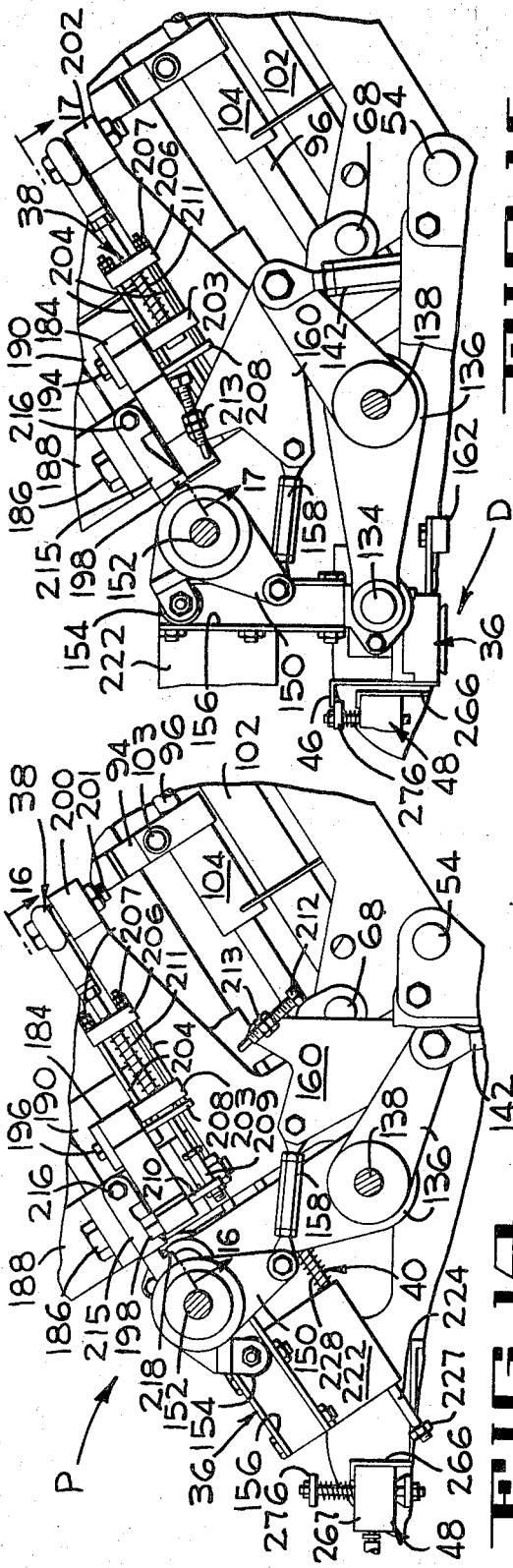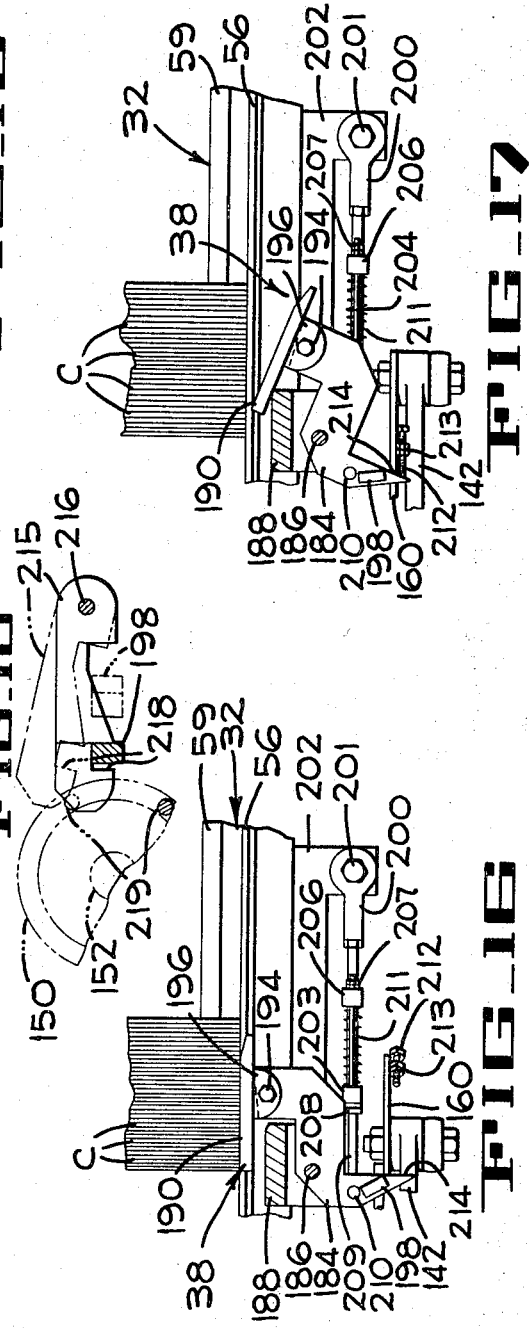

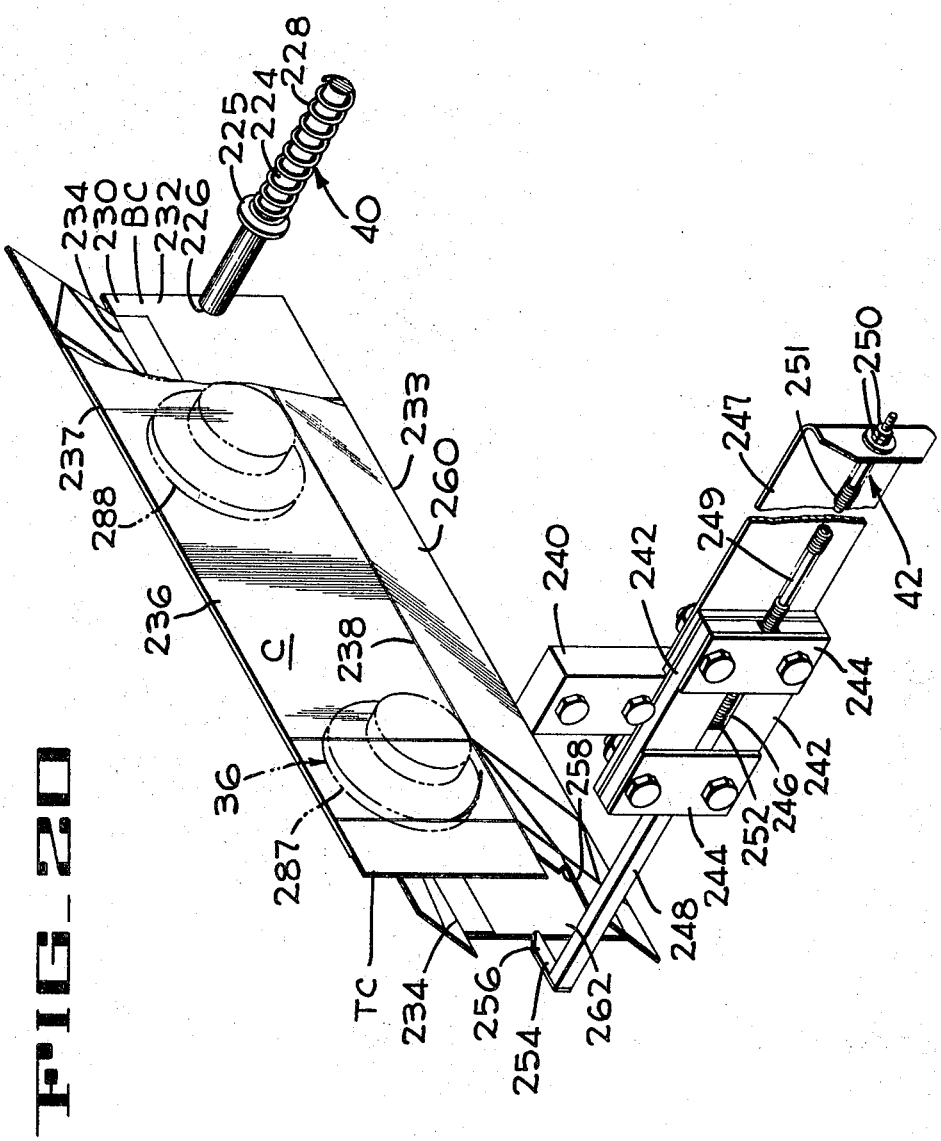

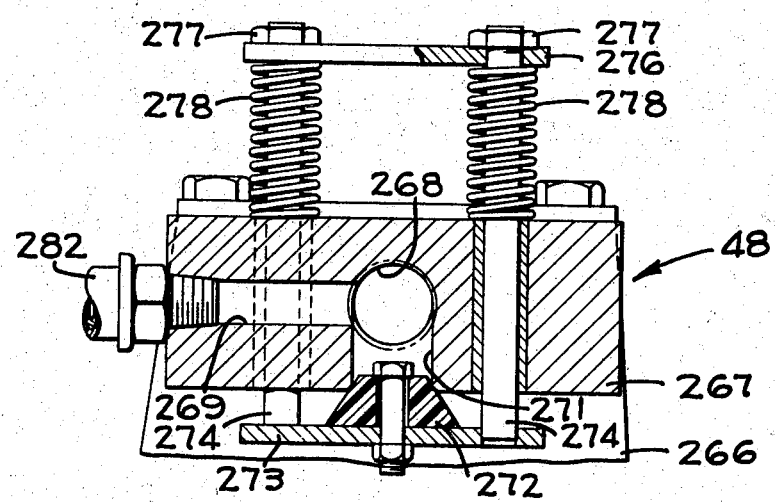
FIG_21
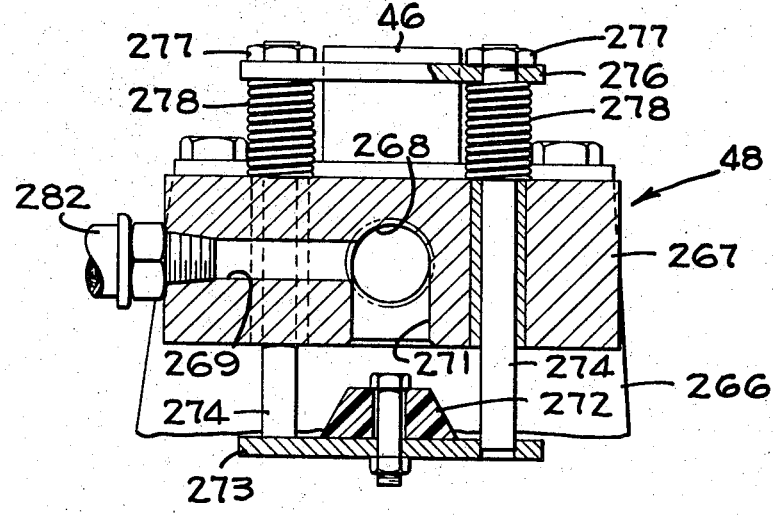
FIG_22

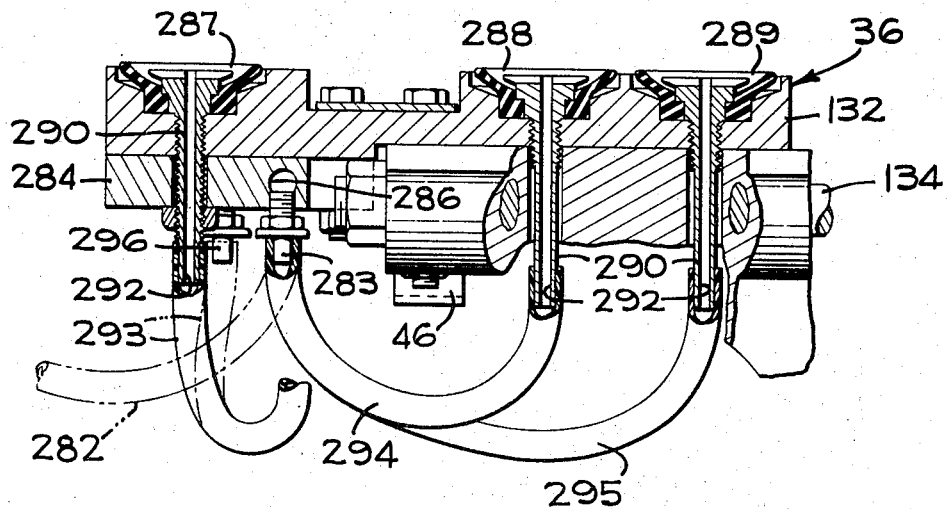
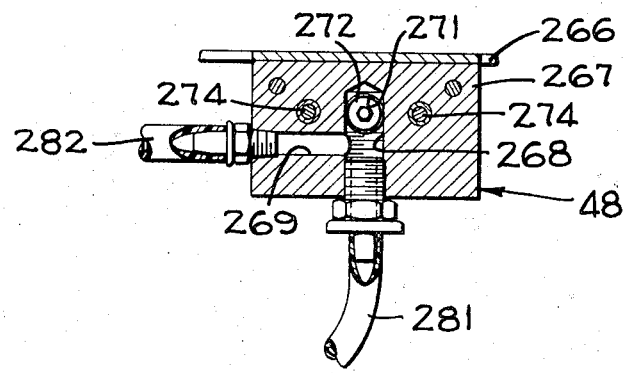

United States Patent Office 3,443,487
Patented May 13, 1969

3,443,487
CARTON ALIGNING AND ERECTING
MECHANISM
Floyd M. Knight, San Jose, Calif., assignor to FMC Corporation, San Jose, Calif., a corporation of Delaware
Filed Feb. 6, 1967, Ser. No. 614,247
Int. Cl. B31b 1/06, 1/80
U.S. Cl. 93—53    20 Claims

ABSTRACT OF THE DISCLOSURE

A carton handling mechanism for accurately adjusting and locking in adjusted position an adjustable wall of a magazine, and for accurately positioning each of the foremost cartons in the magazine while overcoming misalignment of these cartons relative to each other by applying impact forces to the top and to one end of each carton. End openers on a suction head effecting the partial opening of the carton as the suction head withdraws the carton from the magazine. A vacuum system for the suction head which permits rapid operation and minimizes blocking of vacuum passages by debris.

Cross-reference to related applications

The subject mechanism is designed for use in a carton forming and filling machine of the type disclosed in the pending application of Vadas et al., Ser. No. 461,738, said application being assigned to the assignee of the present invention.

Background of the invention

This invention pertains to a carton aligning and erecting mechanism and more particularly relates to an improved mechanism for supporting flat folded carton blanks, hereinafter referred to as cartons, and for erecting these cartons from a flat folded condition to an open ended tubular condition.

Although each carton erecting mechanism disclosed in the above mentioned Vadas et al. application works quite satisfactorily when properly set and adjusted with all four sizes of cartons handled thereby at their designed rate of 60 cartons per minute, such setting is difficult and results inconsistent when each erecting mechanism is operated at speeds of approximately 75 to 100 cartons per minute. When the Vadas mechanism is operating at these high rates, the carton blanks are too often missed or improperly erected thereby causing a carton jam which stops the operation of the machine until the jam has been cleared.

It has been discovered that several features directly effect the successful gripping of the carton blanks, removal of each carton blank from the magazine, and erection of each carton blank from a flat folded condition to a condition wherein the carton is in the form of an open ended tube of rectangular cross section.

At the higher rates of speed, it has been determined that the magazine must be designed so that the distances between its side walls may be very accurately set into the four positions used to accommodate the four different sizes of cartons handled by the machine. In addition to requiring that the magazine walls be accurately positioned, it has also been found necessary to force, preferably by impact forces, all carton blanks against one wall of the magazine and against the carton supporting floor of the magazine at a point near the discharge end of the magazine. Such forces accurately position the cartons and this accurate positioning has been found to be an important factor in achieving efficient pickup by the suction head at the higher rates of speed.

In addition to the carton positioning problem, the two flat folded walls of each carton sometimes tend to adhere to each other. If the two walls of a carton do adhere to each other, the double walls are so stiff as to dislodge the carton from the suction head when the carton is moved downwardly against an abutment or overbend plate, which plate normally serves to open and overbend the carton as the carton is being moved from the magazine into a discharge station. This difficulty is overcome by providing abutment means carried by the suction head which resiliently engage the lower portion of the rear wall of the foremost carton and tend to hold that wall within the magazine while the suction head engages the upper portion of the foremost wall and moves that portion of the wall away from the magazine. Thus, in accordance with the present invention, the carton is partially open before it is moved against the overbend plate thereby reducing the forces which tend to prematurely discharge the carton from the suction head.

It has also been discovered that when operating each of the Vadas et al. erecting mechanism at the higher speed of 75 to 100 cartons per minute, that the conventional structure for evacuating the suction cups to atmosphere after the cartons have been erected and have been deposited in the discharge station is inadequate. Because of the higher operating speeds the prior art suction cups do not completely release the cartons at the discharge station but tend to lift the cartons out of the discharge station when the suction head returns to the magazine to grip another carton.

One reason for the slow reaction of the suction head is due to frictional resistance within the suction passages. This frictional resistance is partially due to abrupt right angle corners in the prior art passageways and also due to the fact that particles of dust and polyethylene are drawn into the passages and accumulate at any sharp corner or angle therein thereby tending to block the passageways. In accordance with the present invention, the passageways are enlarged in diameter and are substantially devoid of abrupt corners or curves thus reducing air flow friction and also reducing the accumulation of dust or debris within these passages to a minimum. Also, an improved positively opened valve is provided to effect the rapid breaking of suction to the suction cups when the suction head is lowered to the discharge station.

Summary of the invention

In accordance with the present invention a high speed carton erecting mechanism is provided which includes a magazine having improved means for adjusting and accurately locking one wall thereof in selected positions to handle cartons of different sizes. The cartons are then driven against one wall and a floor of the magazine by impact forces to accurately position the cartons within the magazine. A rapidly operated suction head, having an improved highly responsive vacuum system, then rapidly withdraws the foremost carton from the magazine, while end opening means resists withdrawal of the rear wall of the foremost carton from the magazine thereby causing partial opening of each carton while partially supported by the magazine.

An object of the invention is to provide a high speed, reliable, carton aligning and erecting mechanism.

Brief description of the drawings

FIGURE 1 is a side elevation of the carton aligning and loading mechanism of the present invention.

FIGURE 2 is a plan of the mechanism of FIGURE 1.

FIGURE 3 is a vertical section through the magazine of the aligning and loading mechanism taken substantially along lines 3—3 of FIGURE 2.

FIGURE 4 is a vertical section similar to FIGURE 3 but illustrating a portion of the magazine with a top evener pivoted to an inoperative position permitting an initial batch of cartons to be easily placed in the magazine.

FIGURE 5 is an enlarged vertical section taken along lines 5—5 of FIGURE 3 illustrating a portion of the magazine.

FIGURE 6 is an enlarged section taken along lines 6—6 of FIGURE 2 illustrating one of the latches for accurately locking a movable wall of the magazine in four selected positions thereby adapting the magazine to handle four different sizes of cartons.

FIGURES 7 to 10 are operational views taken in section along lines 7—7 of FIGURE 2 illustrating the magazine adjusted to handle quart, pint, one-third quart and one-half pint cartons, respectively.

FIGURE 11 is a vertical section taken substantially along lines 11—11 of FIGURE 2 illustrating a suction head and top evener, the suction head being shown in the carton pickup position and certain parts being removed to more effectively illustrate the operation of the top evener.

FIGURE 12 is a view similar to FIGURE 11 but illustrates the suction head in a carton discharge position.

FIGURE 13 is a section taken substantially along lines 13—13 of FIGURE 12, certain parts being cut away and others shown in section.

FIGURE 14 is a vertical section taken along lines 14—14 of FIGURE 2 illustrating a portion of the erecting mechanism with the suction head in the pickup position, said view also illustrating an end evener in the active carton engaging position.

FIGURE 15 is a vertical section similar to FIGURE 14 but illustrating the suction head in the discharge position and illustrating the end evener in the latched position.

FIGURE 16 is a section taken along lines 16—16 of FIGURE 14 showing the end evener contacting the cartons.

FIGURE 17 is a section taken along line 17—17 of FIGURE 15 illustrating the end evener spaced from the cartons.

FIGURE 18 is a schematic view looking in the direction of lines 18—18 of FIGURE 2 illustrating the structure for latching the end evener in the inactive position and also disclosing the structure for unlatching the end evener.

FIGURE 19 is a perspective illustrating the discharge end of the magazine with the suction cups in pickup position and illustrating a bottom closure end opener and a top closure end opener in carton pickup position.

FIGURE 20 is a perspective similar to FIGURE 19 but illustrating the end openers in the carton opening position.

FIGURE 21 is a vertical section taken along lines 21—21 of FIGURE 2 showing a vacuum valve in the closed, unvented position.

FIGURE 22 is a vertical section similar to FIGURE 20 showing the vacuum valve in the open vented position.

FIGURE 23 is an exploded sectional view taken substantially along lines 23—23 of FIGURE 11 illustrating certain passageways which are substantially devoid of abrupt corners and extend from the vacuum valve to each of the suction cups.

*Description of the preferred embodiment*

The high speed carton aligning and erecting mechanism 30 (FIGS. 1 and 2) of the present invention comprises an adjustable magazine 32 which is supported on a frame 34. A suction head 36 is mounted for pivotal movement on the frame 34 from a pickup position P to a discharge position D. As the suction head 36 moves into the pickup position P, a portion of the suction head engages and swings a top evener 37 upwardly for subsequent gravitational impact against the foremost cartons C (FIGS. 11 and 12) to even the tops thereof. As the suction head 36 carries a gripped carton to the discharge position, a resiliently actuated end evener 38 is latched in a resiliently biased inactive position. Upon return of the suction head 36 to the pickup position P, the end evener 38 is unlatched causing the end evener to impact against one end of the foremost cartons thereby urging the foremost cartons firmly against the opposite wall of the magazine 32 and resiliently holding the cartons in this position until after the foremost carton has been withdrawn from the magazine 32. During withdrawal of the foremost quart carton from the magazine, a bottom closure end opener 40 (FIGS. 13, 19 and 20) and a top closure end opener 42 carried by the suction head engage the lower portions of the rearmost panel of the foremost carton and resiliently retain this portion within the magazine 32 while the suction head moves the upper portion of the outermost panel out of the magazine thereby partially opening the carton before the carton is moved against an overbend plate 44 (FIG. 1) and into the discharge position D. Upon reaching the discharge position, a bracket 46 (FIG. 12) secured to the suction head 36 engages and opens a vacuum valve 48 thereby immediately releasing the suction gripper on the erected carton at the discharge position D.

The above described sequence of operation is exactly the same for pint, ⅓ quart and ½ pint cartons except only the bottom closure end opener 40 is used to open the carton.

As mentioned previously, the magazine 32 (FIGS. 1–10) is adjustable to handle four separate sizes of cartons C, the preferred sizes being quarts, pints, one-third quarts and one-half pints as indicated by cartons C1, C2, C3 and C4 in FIGURES 7–10, respectively. The magazine 32 comprises an inclined subframe 52 which is rigidly connected to the frame 34 near its lower end by a cross rod 54 and by a link (not shown) near its upper end. An elongated stationary carton guiding and supporting wall 56 (FIGS. 7 to 10) is rigidly secured to the subframe 52 by brackets 58 and includes a support surface 59 which serves to slidably support the end of the carton C which defines the bottom closure BC (FIG. 19). The inner corner of the stationary guide is relieved at 60 in order to prevent the lower corner of the bottom closure BC from being bent rearwardly as the cartons slide down the magazine.

The magazine 32 also includes an elongated adjustable wall 62 which is accurately positioned to slidably accommodate the top closure TC, and like the stationary wall 56, includes a supporting surface 63 and is relieved at 64 to prevent rearward bending of the lower corner and end surfaces of the top closure TC as the cartons are moved downwardly in the magazine.

The adjustable wall 62 is slidably supported on an upper transversely extending slide rod 66 (FIG. 1) and a lower slide rod 68. The upper rod 66 (FIG. 5) is rigidly secured to the subframe 52 by a snap ring 70 which bears against the lower extension 72 of the stationary wall 56 and is accurately held in position by a nut 74 screwed on the other end of the rod 66 and bearing against a side wall of the sub frame 52. A hub 76 is rigidly secured to the adjustable wall 62 and is slidably received on the rod 66. A latch bar 77 of a latch 78 (FIGS. 5 and 6) is pivotally supported on a pin 80 which is secured to the hub 76 and is received in a slot 82 in the hub for acceptance within a selected one of four grooves 84, 86, 88 and 90 formed in the rod 66. The grooves 84, 86, 88 and 90 are located on the rod so as to accurately maintain the adjustable wall 62 in position to support quart, pint, one-third quart and one-half pint cartons, respectively, when the latch bar 77 is locked in the associated grooves. A spring 92 is connected between the pivot pin 80 and the outer end of the latch bar 77 and serves to lock the bar in the associated groove. When it is desired to adjust the wall 62 to handle different size cartons, the latch bar 77 is merely manually lifted from one groove and allowed to slide along the full diameter portion of the rod while the adjustable wall is being moved to its new position at which time the latch bar enters the appropriate groove.

The lower rod 68 (FIG. 2) is identical to the upper rod 66 and has a latch 78a associated therewith which latch 78a is identical to the latch 78. Accordingly, the latch 78a and associated parts will not be described in detail.

In order to urge the cartons in the magazine 32 downwardly toward the discharge end thereof, a heavy pusher 94 (FIGS. 1 to 4) is slidably supported on a pair of parallel guide rods 96. The guide rods 96 are secured at their ends to carriages 98 and 100 which are slidably received on the transversely extending upper slide rod 66 and lower slide rod 68, respectively. The carriages are also bolted to the opposite ends of a longitudinally extending tie bar 102.

A handle 103 (FIG. 2) is connected to the pusher 94 to aid the operator in moving the pusher upwardly in the magazine 32 when a new batch of cartons are to be inserted in the magazine. As illustrated in FIGURES 3 and 4, elongated hubs 104 are formed on the pusher 94 and when in its lowermost position engage the lower carriage 100 which permits the heavy pusher 94 to be spaced from the discharge end of the magazine 32. With the pusher 94 held spaced from the discharge end of the magazine, an operator can more easily and more accurately place the initial group of cartons into the magazine since he does not have to manually hold the pusher away from these cartons. This initial magazine loading operation is aided by pivoting the top evener 37 to an inoperative upper position as illustrated in solid lines in FIGURE 4 thus giving the operator complete unencumbered freedom when placing the initial batch of cartons in the magazine.

A normally closed limit switch 106 (FIG. 3) is opened by a pivotally mounted sensing finger 108 immediately prior to movement of the pusher 94 to its lowermost position. This switch 106 is connected to the drive motor (not shown) of the erecting mechanism 30 and opens to shut off the vacuum in the event the operator neglects to maintain a sufficient quantity of cartons in the magazine.

In order to adjust the wall 62 and to maintain the pusher 94 midway between the walls 62 and 56, the magazine 32 is provided with a double threaded transversely extended adjustment screw 110 (FIGS. 7-10). The screw 110 includes a small diameter portion 111 having a crank 112 secured to its free end, an intermediate diameter portion 113 having a screw thread thereon, and a large diameter portion 114 having a screw thread thereon which thread has twice the pitch as the thread on the intermediate diameter portion. A pair of collars 116 are set screwed to the small diameter portion 111 and are disposed immediately adjacent opposite sides of a bearing block 117 which is secured to the subframe 52 as by bolting. The intermediate diameter portion 113 extends through a hole in the tie bar 102 and is screwed in a threaded block 118 that is bolted to the tie bar 102 as indicated in FIGURE 3. The large diameter portion 114 extends through a hole in the adjustable wall 62 and is screwed into a threaded block 119 that is bolted to the wall 62. Thus, adjustment of the wall 62 and the pusher 94 is effected by merely rotating the screw 110 by means of a crank 112 after first releasing the latches 78 and 78a. Because the pitch of the threads of the large diameter portion 114 is twice the pitch of the threads on the intermediate diameter portion, the pusher will always remain midway between the ends of the walls 56 and 62. The screw 110 is rotated until the latch bars 77 of both latches 78 and 78a become seated in the particular grooves 84, 86, 88 or 90 associated with the particular size of carton being handled thereby rigidly locking the adjustable wall 62 in position to support the carton.

The foremost carton in the magazine 32 is held in the magazine, until positively withdrawn by the suction head 36, by an upper abutment bar 120 and a lower abutment bar 121 (FIGS. 11 and 19). The upper bar 120 extends transversely across the discharge end of the magazine 32 and is rigidly secured to the subframe 52 as by bolting. As best illustrated in FIGURE 19, the upper bar 120 includes a leveling surface 122 and a lip 124 which projects downwardly from the levelling surface. The lower carton abutment bar 121 is bolted to the wall 56 of the magazine 32 and to a portion of the sub frame 52. The lower bar 121, like the upper bar 120, defines a lip 125 which projects a short distance above the carton supporting surfaces 59 and 63 upon which rests the lower edge of the foremost carton in the magazine 32, and thus cooperates with the upper lip 124 to hold the foremost carton in the magazine until pulled therepast by the suction head 36.

The suction head 36 and the means for swinging the head between the pickup position P and discharge position D are employed for energizing both the top evener 37 and the end evener 38. As best shown in FIGURES 11, 12 and 13, the suction head 36 includes a body 132 of generally L-shaped construction, which body is pivotally mounted on a shaft 134. The shaft 134 is connected to one end of a bell crank 136 that is pivoted on a shaft 138 secured to a vertical portion 140 of the frame 34. The other end of the bell crank 136 is pivotally connected by a link 142 to an eccentric pin 144 projecting outwardly of the face of a cam disc 146 that is secured to a shaft 148 and is continuously driven by means fully disclosed in the previously mentioned Vadas et al. application thereby causing the bell crank 136 to oscillate about the shaft 138.

The suction head 36 is pivoted about the shaft 134 by a bell crank 150 which is pivotally supported by a shaft 152 secured to the vertical portion 140 of the frame 34. A roller 154 is journalled on one end of the bell crank 150 and is slidably received in a cam track 156 formed on the suction head 36. The other end of the bell crank 150 is pivotally connected to a link 158 and the other end of the link 158 is pivotally connected to a bracket 160 which is rigidly secured to bell crank 136. Thus, as the bell crank is pivoted from the position shown in FIGURE 11 to the position shown in FIGURE 12, the suction head is simultaneously pivoted in a clockwise direction about both shaft 134 and shaft 138.

As indicated in FIGURES 11 and 12, the suction head 36 has an overbend bar 162 which activates the top evener 37 when the head is moved to the pickup position P to swing the top evener to the position illustrated in FIGURE 11. The head subsequently returns to the position illustrated in FIGURE 12 contacting the upper surface of the foremost cartons to drive the cartons downwardly and precisely align the cartons vertically.

The top evener 37 is of relatively heavy construction and comprises a pair of spaced support arms 164 (FIG. 2) which are pivoted on a transverse shaft 166 secured to the subframe 52 and have an actuating bar 168 and a top evening bar 170 rigid therewith. The actuating bar 168 may be covered by a resilient sleeve so that contact by the overbend bar 162 emits little objectionable sound. The top evening bar 170 has a flat carton engaging surface 174 with an upwardly beveled rear end 176. The forward end of the bar 170 is provided with a plurality of forks 178 which extend through slots 180 (FIGS. 3 and 4) formed in the stationary upper carton abutment bar 120 and retains vertical alignment of the cartons to the instant of pickup. The leveling surface 122 of the abutment bar 120, and the surface 174 of the top evener bar 170 lie in a common plane when the top evener bar is in the carton engaging position illustrated in FIGURE 12. Thus, the forks 178 will assure a smooth, unobstructed flow of cartons down the magazine and under the leveling surface 122 of the upper bar 120 for subsequent termination of movement of the cartons by lips 124 and 125.

The top evener 37 operates as follows: As the suction head 36 moves to the pickup position P (FIG. 11), the overbend bar 162 strikes the actuating bar 168 causing the top evener 37 to swing upwardly as illustrated in FIGURE 11. As the suction head is moving the gripped carton to the discharge position P, the top evener 37 swings downwardly under the influence of gravity to the position illustrated in FIGURE 12 thereby applying an impact force to the upper edges of the contacted cartons causing these edges to be moved into a common plane.

The end evener 38 (FIGS. 14 to 18) is provided for forcing the cartons against the adjustable wall 62 of the magazine 32 before the cartons reach the discharge end of the magazine. The end evener 38 is resiliently energized as the suction head 36 moves from the pickup position P to the discharge position D, and is resiliently urged against the cartons shortly before the suction head reaches the pickup position P.

The end evener 38 comprises a generally Z-shaped lever 184 (FIGS. 16 and 17) pivotally mounted on a bolt 186 which is secured to a yolk 188 formed in the subframe 52. An abutment shoe 190 is mounted for limited pivotal movement on one end of the lever 184 by a bolt 194 that extends through the lever 184 and through a yolk 196 welded to the shoe 190. A latching ear 198 is welded to the other end of the lever 184 and projects upwardly therefrom.

In order to resiliently load the lever 184, one end of a link 200 is pivotally connected by a bolt 201 to a bracket 202 that is rigidly secured to the subframe 52. A slide bar 203 is secured to the other end of the link 200 and slidably receives a pair of rods 204 which are connected to a second slide bar 206 by nuts 207 screwed on one end of each rod 204. The other end of the rods are secured as by welding to a cross bar 208 which is welded to a link 209 pivotally connected to the Z-shaped lever 184 by a pin 210. A helical compression spring 211 is disposed around a portion of the link 200 between the slide bars 203 and 206.

The spring 211 is compressed as an incident to the movement of the suction head from the pickup position P to the discharge position D. In this regard, an adjustment screw 212 is screwed into a nut 213 that is welded to a bracket 160 and is locked in place by a locknut.

The free end of the adjustment screw 212 engages a camming surface 214 of the Z-shaped lever 184. As the suction head moves from the pickup position P to the discharge position D, the latching ear 198 moves along the lower surface of a latching lever 215, which lever is pivoted to the subframe by a cap screw 216, and enters a latching slot 218 in the latching lever 215 which locks the Z-shaped lever 184 in a resiliently loaded position as the suction head 36 returns to the pickup position P. Immediately before reaching the pickup position, a pin 219 (FIG. 18) which is secured to and projects outwardly of the bell crank 150 moves upwardly against the free end of the latching lever 215 and unlatches the Z-shaped lever 184 thereby causing the Z-shaped lever to resiliently urge the abutment shoe 190 against the bottom closure ends of the cartons forcing the cartons against the movable wall 62 of the magazine 32 and into precise lateral alignment. It should also be noted that this force is maintained against the cartons while the suction head 36 is withdrawing a carton from the magazine thus assuring precise lateral alignment to the instant of pickup.

As mentioned previously, the bottom closure end opener 40 and top closure end opener 42 (FIGS. 13, 19 and 20) are supported by the suction head 36 and serve to hold a portion of each carton in the magazine 32 while the suction head 36 moves another portion out of the magazine. In this way the natural tendency of the upstream wall of the carton to advance downstream prematurely is overcome and any carton which has one of its walls adhered to another of its walls is caused to partially open to separate the walls from each other before the carton is swung downwardly against the overbend plate 44 (FIG. 1). This action greatly reduces the possibility of the upstream wall of the carton from bending in the wrong direction and results in dislodgement of the carton from the suction head because of failure to open. As indicated in FIGURES 19 and 20, both the bottom closure opener 40 and top closure opener 42 are used with quart size cartons. However, when the shorter sizes of cartons are being handled, it has been determined that only the bottom closure end opener 40 is needed.

The bottom closure opener 40 comprises a slide block 222 (FIG. 13) that is bolted to the body 132 of the suction head 36 and has a rod 224 slidably received therein. The rod 224 has a large diameter ring 225 secured thereto near its carton engaging end 226 and has nuts 227 screwed onto its other end. A helical compression spring 228 is disposed around the rod 224 and between the ring 225 and the block 222 and urges the rod toward the carton. When in position to engage the carton, the end 226 of the rod 224 resiliently engages the flap 230 of the bottom closure BC of the foremost carton C, which flap 230 is a part of the lower rear wall 232 of the carton and is positioned between a lower edge 233 of the carton and an intermediate rear score line 234 (FIG. 20). The suction head 36 engages the upper foremost wall 236 of the carton, which wall is defined between the upper edge 237 of the carton and an intermediate forward score line 238 (FIG. 20).

The top closure opener 42 (FIGS. 13, 19 and 20) comprises a block 240 bolted to the free end of the body 132 of the suction head 36. A pair of spaced longitudinally extending slide blocks 242 and a pair of spaced transversely extending slide blocks 244 are bolted to the block 240 and cooperate therewith to define a guideway 246 of square cross section. An angle spring retaining bracket 247 is also bolted to the block 240 and has a hole therein that is aligned with the guideway 246. A rod 248 of square cross section is slidably received in the guideway 246 and has a cylindrical portion 249 which extends through the hole in the bracket 247 and has a pair of nuts 250 screwed thereon. A helical compression spring 251 is disposed around the cylindrical portion 249 and between the bracket 247 and the squared end 252 of the rod 248. A carton engaging finger 254 having a V-shaped end 256 is welded to the free end of the rod 248 and is positioned so that the V-shaped end 256 passes through a notch 258 in the top closure forming flap of the forward lower wall 260 of the carton and engages a top closure flap 262 on the lower rear wall 232 as clearly illustrated in FIGURE 20.

As the suction head 36 moves into the pickup position P, the carton engaging end 226 of the bottom closure opener 40 engages the flap 230 which resists rearward movement and accordingly causes the rod 224 to move relative to the suction head 36 and the spring 228 to become compressed. Similarly, the V-shaped end 256 engages the top closure flap 262 and likewise causes the rod 248 to move relative to the suction head thereby compressing the spring 251. The suction head 36 then grips the carton and moves rearwardly toward the discharge position D thereby pulling the upper edge 237 of the carton and the upper forward wall 236 out of the magazine 32. However, the top closure opener 42 and the bottom closure opener 40 resiliently holds the lower rear wall 232 and lower edge 233 of the carton in the magazine causing the carton to pivot about the edges 233, 234, 237 and 238 thereby assuming the partially open position shown in FIGURE 20 before the edge 233 is removed from the magazine. The partially erected carton is then pulled completely out of the magazine 32 over the lip 125 (FIG. 19) and then, while in its partially open position, is moved downwardly against the overbend plate 44 (FIG. 1). Continued movement of the suction head 36 then overbends the carton and places the carton in tubular rectangular shape in the discharge position D, all as fully disclosed in the aforementioned Vadas et al. application.

It has been discovered that polyethylene particles and dust accumulate in closed guideways unless means are provided to clean these particles from the guideways. Accordingly, the stroke of the rode 248 is longer than the width of the transverse slide blocks 244, which transverse blocks serve to scrape any buildup of polyethylene and dust from the rod during reciprocation of the rod.

In addition to the polyethylene particles and dust accumulating on guideways, these particles and dust are also drawn into the vacuum system and tend to accumulate at any sharp corners in the system thereby partially blocking the system and making the vacuum system too sluggish to operate at the above mentioned high speeds. In accordance with the present invention these difficulties have been eliminated by providing larger passages with a minimum of abrupt corners, and by providing the simple, but rapidly operating vacuum valve 48.

The vacuum valve 48 (FIGS. 11, 12 and 21–23) is mounted on a bracket 266 which is bolted to the subframe 52. The valve 48 comprises a body 267 having an inlet passage 268, a discharge passage 269 and a vent passage 271 all communicating with each other. A frustoconical valve head 272 is bolted to a plate 273 which is welded to two upstanding guide rods 274 that are slidably received in holes formed in the body 267. A spring retainer 276 is connected to the upper ends of the guide rods 274 by nuts 277. Compression springs 278 are positioned around the associated guide rods 274 and are disposed between the body 267 and the spring retainer 276 to normally hold the valve head 272 in closed position thereby blocking the vent passage 271 as illustrated in FIGURE 21 causing vacuum to be applied to the suction head 36.

The valve head 272 is held closed at all times except for the brief interval when the suction head 36 is in the discharge position D. When in this position, the Z-shaped lever 46 engages the spring retainer 276 forcing it downwardly to the position illustrated in FIGURE 22 thereby opening the valve and venting the passages in the suction head 36.

The inlet passage 268 (FIG. 23) is connected to a source of vacuum (not shown) by a conduit 281. A flexible conduit 282 of relatively large internal diameter connects the discharge passage 269 to one of four aligned tube fittings 283 (only one fitting being shown in FIGURE 23). The fittings are screwed into a manifold 284 (FIGS. 13 and 23) that is bolted to the suction head 36, and all fittings communicate with a passage 286 therein. The suction head 36 includes three resilient suction cups 287, 288 and 289. The cups are each held within the body 132 by a stem 290 which is threaded and is screwed into the body 132. Each stem 290 has an unobstructed linear passage 292 therein and communicates with the interior of the associated cups. The other ends of the stems 290 of the suction cups 287, 288 and 289 are connected by flexible resilient conduits 293, 294 and 295, respectively, to associated ones of the tube fittings 283 thereby providing smooth unobstructed passages between the cup and the manifold 284.

When the carton aligning and erecting mechanism is arranged to handle quart size cartons, all three of the suction cups 287, 288 and 289 are used. When pint, one-third quart, one-half pint cartons are being erected, the suction cup 287 is rendered inoperative by withdrawing the conduit 293 from the associated stem 290 and placing it over a dead plug 296 that is bolted to the manifold 284 as indicated in FIGURE 23.

Although the operation of the several components of the carton aligning and erecting mechanism 30 have been included in the detailed description thereof, a summary of the operation will follow.

Assuming that the magazine 32 (FIGS 1 and 2) is empty and that the drive motor (not shown) for the erecting mechanism 30 is not yet started, the operator first determines what size of cartons are to be erected. If the adjustable magazine wall 62 is not in proper position to handle that size of carton, the operator then manually releases the latches 78 and 78a (FIG. 2) and then operates the adjustment screw 110 to move the wall 62 to the desired position, for example to the quart size position illustrated in FIGURES 5 and 7. When the wall is in the quart position, the springs 92 cause each latch bar 77 to snap into the associated quart groove 84. The operator then firmly tightens the latch bar 77 against the left (FIG. 5) edge of the associated groove 84 by further rotation of the adjustment screw 110 in the appropriate direction thus very accurately positioning the wall 62 of the magazine 32.

With the pusher 94 held in the position illustrated in FIGURE 4 by abutment of the hubs 104 with the lower carriage 100, the operator raises the top evener 37 to the inactive position illustrated in solid lines in FIGURE 4. The operator can then easily and accurately place a handful of cartons into the discharge end of the magazine without interference from the top evener 37 or from the pusher 94. The operator then completely fills the magazine with cartons after first pulling the pusher 94 upwardly and to the right as illustrated in FIGURE 1. He then returns the top evener 37 to the operative position illustrated in solid lines in FIGURE 3.

With the magazine filled, the switch 106 opens thereby permitting the vacuum to be activated causing the suction head 36 to function fully between the pickup position P and the discharge position D. Movement of the suction head 36 away from the pickup position P causes the end evener 38 to become resiliently loaded thereby asuming the latched position illustrated in FIGURES 15 and 17. Return of the suction head to the pickup position P causes unlatching of the end evener 38 resulting in the impacting of the end evener upon the bottom closure ends of the cartons near the lower end of the magazine thereby accurately positioning the other ends of the cartons against the adjustable magazine wall 62. Upon reaching the pickup position P, the overbend bar 162 (FIG. 11) contacts the top evener 37 causing it to first pivot upwardly and thereafter swing downwardly against the top of the cartons to move the top edges of the cartons into a common plane.

In addition to performing the above aligning operations, as the suction head moves toward the pickup position the carton engaging end 226 of the bottom closure end opener 40 (FIGS. 19 and 20) and the V-shaped end 256 of the top closure end opener 42 resiliently engage the end closure flaps 230 and 262, respectively, thereby partially opening each carton before the carton is completley withdrawn from the magazine 32. The partially erected carton is then swung downwardly against the overbend plate 44 thereby overbending the carton as the carton is being moved into the discharge position D. Upon reaching the discharge position, the bracket 46 engages and momentarily opens the vacuum valve 48.

Because the passages within the valve 48 and within the conduits leading to the suction cups 287, 288 and 289 are substantially devoid of sharp curves or corners and are relatively large in internal diameter, these cups are immediately vented upon opening the valve 48 thereby releasing the erected carton at the discharge station D and permitting the suction head 36 to immediately return to the pickup position to receive and erect another carton.

From the foregoing description it is apparent that the carton aligning and erecting mechanism of the present invention includes several devices which cooperate to very rapidly erect cartons of preselected sizes. The mechanism includes means for accurately positioning and locking an adjustable wall of a magazine in position to handle a predetermined size of cartons, and thereby providing means for accurately locating the cartons in the magazine. The mechanism also includes means for partially opening the carton before the carton is entirely withdrawn from the magazine, and includes a vacuum system which avoids being clogged by dust and polyethylene particles and is very rapid in response to opening and closing of the vacuum valve to vent and apply suction, respectively, to the suction cups.

Although the best mode contemplated for carrying out the present invention has been herein shown and described, it will be apparent that modifications and variations may be made without departing from what is regarded to be the subject matter of the invention as set forth in the appended claims.

Having completed a detailed description of the invention so that those skilled in the art could practice the same, I claim:

1. In a carton aligning and erecting mechanism the combination of a magazine having a discharge opening, means in said magazine defining carton supporting and retaining walls, means at said discharge opening for releasably retaining a supply of cartons in said magazine, carton gripping means movable along a path between a pickup position at said discharge opening wherein the foremost carton is gripped for removal from said magazine and a discharge position wherein the foremost carton is released from said gripping means, compacting means adjacent said discharge opening and supported for pivotal movement between a position spaced from the foremost cartons in said magazine to a position bearing against the cartons and urging the contacted cartons toward one of the magazine walls, and actuating means operatively connected between said gripping means and said compacting means for intermittently causing said compacting means to pivot against the cartons with an impact force thereby driving the contacted cartons against said one magazine wall.

2. An apparatus according to claim 1 wherein said compacting means is pivotally mounted above the cartons adjacent said discharge opening, and wehrein said actuating means includes a bar carried by said gripping means and arranged to contact and swing said compacting means upwardly as said gripping means enters said pickup position and to thereafter move away from said compacting means permitting said compacting means to gravitate against the carton while said gripping means is moving toward said discharge position.

3. An apparatus according to claim 2 wherein said means for releasably retaining said carton within said magazine includes an upper cross rod having a carton leveling surface and a carbon engaging lip projecting downwardly therefrom and having at least one slot therein, and wherein said compacting means is a plate which includes a flat carton engaging surface having a foremost end defining at least one fork which extends through said one slot to assure proper feeding of the foremost carton under said leveling surface and against said lip.

4. An apparatus according to claim 1 wherein said magazine is inclined and includes a pusher slidably received therein for urging cartons toward said discharge opening, abutment means in said magazine for spacing the pusher from said discharge opening, and mounting means rigidly secured to said magazine for supporting said compacting means in a stable inoperative position above and spaced from said magazine discharge opening thereby allowing easy and accurate filling of the foremost cartons in the magazine without interference from said pusher or from said compacting means.

5. An apparatus according to claim 1 wherein said compacting means is pivotally mounted adjacent one end of the foremost cartons in said magazine adjacent said magazine discharge opening, and wherein said actuating means includes resilient means connected to said compacting means for normally urging said compacting means toward the cartons in said magazine, means carried by said gripping means and operatively connected to said compacting means for energizing said resilient means and for moving said compacting means away from the cartons as said gripping means moves between the pickup position and the discharge position, means for momentarily latching the compacting means away from the cartons when said resilient means is energized, and means timed with the movement of said gripping means for unlatching said compacting means causing said compacting means to abruptly contact the adjacent ends of the cartons causing the opposite ends of the cartons to move against the adjacent magazine wall.

6. An apparatus according to claim 5 and additionally comprising a lever pivotally supported by said magazine, said compacting means including an abutment plate which is pivotally mounted on one end of said lever, said resilient means including a spring having one of its ends attached to said lever near the other end of said lever, said resilient means having its other end supported by said magazine.

7. An apparatus according to claim 6 wherein a latching ear is rigidly secured near the other end of said lever, and wherein said means for latching the abutment plate away from the cartons includes a lever pivotally mounted on said magazine and having a notch therein engageable with said ear, and wherein the means for unlatching said abutment plate includes an abutment pin carried by said gripping means and disposed for movement into position to engage and unlatch said abutment plate while said gripping means is moving toward said pickup position.

8. An apparatus according to claim 2 wherein a second compacting means is provided, and wherein said second compacting means is pivotally mounted at one end of the cartons in said magazine adjacent said magazine discharge opening, and wherein said actuating means includes resilient means connected to said second compacting means for normally urging said second compacting means toward the cartons in said magazine, means carried by said gripping means and operatively connected to said second compacting means for energizing said resilient means and for moving said second compacting means away from the cartons as said gripping means moves between the pickup position and the discharge position, means for momentarily latching said second compacting means away from the carton when said resilient means is energized, and means timed with the movement of said gripping means for unlatching said second compacting means causing said second compacting means to abruptly contact the adjacent end of the foremost cartons moving the opposite ends of the cartons against the adjacent magazine wall.

9. An apparatus according to claim 7 and additionally comprising a top compacting means which includes an abutment plate pivotally mounted above the cartons adjacent said discharge opening, and wherein said actuating means includes a bar carried by said gripping means and arranged to contact and swing said top abutment plate upwardly as said gripping means enters said pickup position and to move away from said top abutment plate permitting said plate to gravitate against the upper surfaces of the cartons while said gripping means is moving toward said discharge position.

10. In a carton aligning and erecting mechanism the combination of a magazine having a restricted discharge opening adapted to support a plurality of flat folded cartons therein, each of said cartons having a foremost wall and a rear wall, carton gripping means for withdrawing the foremost carton from said magazine, and carton opening means carried by said gripping means, a finger included in said opening means and movable relative to said gripping means, means urging said finger against said rear wall for engaging the rear wall of the foremost carton and for holding a portion of said rear wall in the magazine while said gripping means is moving a portion of the foremost wall out of the magazine whereby the foremost wall is separated from the rear carton wall and the carton is partially erected while a portion of the rear wall remains in said magazine.

11. In a carton aligning and erecting mechanism the combination of a magazine having a restricted discharge opening adapted to support a plurality of flat folded cartons therein, each of said cartons having a foremost wall and a rear wall, carton gripping means for withdrawing the foremost carton from said magazine, carton opening means for engaging the rear wall of the foremost carton and for holding a portion of said rear wall in the magazine while said gripping means is moving a portion of the foremost wall out of the magazine whereby the foremost carton wall is separated from the rear carton wall and the carton is partially erected while a portion of the rear wall remains in said magazine, said carton opening means being mounted on said gripping means and includes carton engaging means slidably supported on said gripping means, and resilient means interconnecting said carton engaging means and said gripping means for resiliently urging said carton engaging means against the rear wall of the foremost carton in the magazine when said gripping means moves into said pickup position, said carton engaging means remaining in contact with said rear wall for holding a portion of said rear wall in the magazine as the gripping means moves another portion of the foremost carton out of the magazine.

12. In a carton aligning and erecting mechanism the combination of a magazine having a restricted discharge opening adapted to support a plurality of flat folded cartons therein, each of said cartons having a foremost wall and a rear wall, carton gripping means for withdrawing the foremost carton from said magazine, carton opening means for engaging the rear wall of the foremost carton and for holding a portion of said rear wall in the magazine while said gripping means is moving a portion of the foremost wall out of the magazine whereby the foremost carton wall is separated from the rear carton wall and the carton is partially erected while a portion of the rear wall remains in said magazine, said carton opening means being mounted on said gripping means and includes a first carton engaging means and a second carton engaging means with both said means being slidably supported on said gripping means, resilient means interconnecting each of said carton engaging means and said gripping means for resiliently urging said first and second carton engaging means against opposite ends of said rear wall of the foremost carton in the magazine when said gripping means moves into said pickup position, said carton engaging means both remaining in contact with said rear wall for holding a portion of said rear wall in the magazine as the gripping means moves another portion of the foremost carton out of the magazine.

13. In a carton aligning and erecting mechanism a magazine adapted to handle cartons of different sizes comprising an elongated frame, a stationary wall rigidly secured to said frame, a pair of spaced rods secured to and extending transversely of said frame, an adjustable wall slidably supported by said rods for movement toward and away from said stationary wall, each of said walls being of generally L-shaped construction and including a carton supporting and carton confining surface disposed at right angles to each other, a longitudinally extending slide disposed between said walls and slidably supported by said transverse rods, a carton pusher slidably received on said slide for urging the cartons toward one end of the magazine, and adjustment means for varying the distance between said walls extending transversely of and held from axial movement relative to said frame, said adjustment means being connected to said adjustable wall and to said slide and upon adjustment being arranged to maintain the slide midway between said walls.

14. An apparatus according to claim 13 wherein said adjustment means includes an adjustment rod having a first threaded portion of predetermined pitch threaded into said slide and a second threaded portion having twice said predetermined pitch threaded into said adjustable wall, and means for rotating said rod in either direction.

15. An apparatus according to claim 13 wherein a plurality of locking slots are formed in said transverse rods with each slot in each rod corresponding to a predetermined carton size, and latching means carried by said adjustable wall and adapted to be placed in selected ones of said slots to lock the adjustable wall in position to handle cartons of a predetermined size.

16. An apparatus according to claim 14 wherein a plurality of locking slots are formed in said transverse rods with each slot in each rod corresponding to a predetermined carton size, and latching means associated with each rod carried by said adjustable wall and adapted to be placed in selected ones of said slots to lock the adjustable wall in position to handle cartons of a preselected size.

17. An apparatus according to claim 16 wherein each of said locking means comprises a hub mounted on said adjustable wall and having a groove therein, a latching bar pivotally mounted on said hub for movement in said groove into locking engagement with a selected one of said slots, and resilient means connected between said latching bar and said hub for urging said latching bar toward the associated transverse rod.

18. In a carton aligning and erecting mechanism the combination of a magazine having a discharge opening, means at said discharge opening for releasably retaining a carton in said magazine, a suction gripping head, a plurality of suction cups on said head, each suction cup provided with a stem having a large diameter linear suction passage therein, means for moving said head between a pickup position at said discharge opening wherein the foremost carton is gripped for removal from said magazine and a discharge position wherein the foremost carton is released from said suction head: the improvement which comprises a vacuum valve having a valve body; said valve body having an inlet passage connected to a source of vacuum, a discharge passage, and a vent passage communicating with said inlet passage and discharge passage and opening to the atmosphere; a valve head; resilient means normally urging said valve head into position to close said vent passage; a manifold in said suction head, large diameter flexible conduits connecting each suction cup to said manifold, conduit means connecting said discharge passage to said manifold; and means carried by said suction head for momentarily engaging and moving said valve head away from said vent passage as said suction head enters the discharge position thereby immediately venting said suction cup to the atmosphere and releasing the carton therefrom; a dead plug mounted on the suction head; one of said flexible conduits leading to one of said suction cup stems being removable from said stem placeable on said dead plug thereby deactivating said one suction cup without venting the other suction cups to the atmosphere.

19. In a carton aligning and erecting mechanism which includes an inclined magazine having a discharge opening, means in said magazine defining a stationary carton supporting and retaining wall and an adjustable supporting and retaining wall, means at said discharge opening for releasably retaining a supply of flat folded tubular cartons in said magazine, a suction head movable along a path between a pick-up position at said discharge opening wherein the foremost carton is gripped for removal from said magazine and a discharge position wherein the foremost carton is released from said suction head, and a suction cup carried by said suction head, said cartons when in flat folded condition each having a foremost wall and a rear wall connected together by an upper and a lower hinge line, said foremost wall and said rear wall each being provided with an intermediate scored hinge line disposed between said upper and lower hinge lines whereby each carton may be erected from a flat folded condition to a tubular condition of generally rectangular cross section: the improvement which comprises means for adjusting said adjustable wall to accurately accommodate cartons of a preselected size; a pusher in said magazine posittioned between said walls; said adjusting means including a rod held from axial movement relative to said stationary wall, a first threaded portion having a predetermined pitch operatively connected to said pusher, and a second threaded portion of twice said predetermined pitch operatively connected to said adjustable wall; an abutment plate adjacent said discharge opening and supported for pivotal movement between a position spaced from said cartons to a position bearing against said cartons and urging the contacted cartons toward one of the magazine walls; actuating means operatively connected between said suction head and said abutment plate for intermittently causing said abutment plate to pivot against the carton with an impact force thereby driving the contacted cartons against said one magazine wall; carton opening means for engaging the rear wall of the foremost carton and for holding a portion of said rear wall in the magazine while said suction head is moving a portion of the foremost wall out of the magazine whereby the foremost carton wall is separated from the rear carton wall; a vacuum valve communicating with a source of vacuum and with said suction cup and having a vent passage therein; a valve head resiliently urged against said vent passage to normally close said passage; and means carried by said suction head for momentarily opening said passage as an incident of movement of said suction head to said discharge position.

20. In a carton erecting apparatus including a magazine, a frame through which tubular folded cartons having a forward wall and a rear wall are withdrawn, and suction gripping means for withdrawing said cartons from the magazine through the frame and placing the erected carton at a discharge station, the combination comprising means for adjusting the magazine to accommodate cartons of different sizes with said cartons aligned along one saide of said magazine, means for periodically alternately compacting a stack of cartons in said magazine for precise alignment along at least one common edge, withdrawal resisting means carried by said suction gripping means for resisting withdrawal of said rear wall from said frame so that a portion of said rear wall remains in said magazine until the front wall is substantially separated therefrom, and means responsive to movement of the suction gripping means to the discharge station for rapidly evacuating said suction gripping means, said withdrawal resisting means including carton engaging means movably supported on said suction gripping means and also including resilient means interconnecting said carton engaging means and said gripping means for resiliently urging said carton engaging means against the rear wall of the foremost carton in the magazine when said suction gripping means is in engagement with the forward wall of said foremose carton in the magazine, said carton engaging means remaining in contact with said rear wall for holding a portion of said rear wall in the magazine as the gripping means moves another portion of the foremost carton out of the magazine.

References Cited

UNITED STATES PATENTS

| | | |
|---|---|---|
| 2,887,020 | 5/1959 | Currie. |
| 2,993,314 | 7/1961 | Havemann. |
| 2,994,253 | 8/1961 | Jones. |
| 3,060,654 | 10/1962 | Lubersky. |
| 3,242,827 | 3/1966 | Winters. |
| 3,269,279 | 8/1966 | Vadas. |
| 3,299,611 | 1/1967 | Hendrick _____ 93—53 X |
| 3,354,610 | 11/1967 | Stelzer. |
| 3,354,796 | 11/1967 | Lopez. |

WAYNE A. MORSE, JR., *Primary Examiner.*

U.S. Cl. X.R.

93—36, 51